United States Patent
Conner et al.

(10) Patent No.: US 11,662,534 B2
(45) Date of Patent: May 30, 2023

(54) ONLINE HELIX ADJUSTMENT TO CONTROL CONNECTOR LOCATION ON PRECONNECTORIZED TAPERED ASSEMBLIES

(71) Applicant: CORNING RESEARCH & DEVELOPMENT CORPORATION, Corning, NY (US)

(72) Inventors: Mark Edward Conner, Granite Falls, NC (US); Eric Scott Quinby, Granite Falls, NC (US); James Arthur Register, III, Hickory, NC (US); Hieu Vinh Tran, Charlotte, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/546,487

(22) Filed: Dec. 9, 2021

(65) Prior Publication Data

US 2022/0099905 A1 Mar. 31, 2022

Related U.S. Application Data

(62) Division of application No. 17/002,883, filed on Aug. 26, 2020, now Pat. No. 11,209,602.
(Continued)

(51) Int. Cl.
*G02B 6/44* (2006.01)

(52) U.S. Cl.
CPC ........... *G02B 6/4413* (2013.01); *G02B 6/443* (2013.01); *G02B 6/449* (2013.01)

(58) Field of Classification Search
None
See application file for complete search history.

(56) References Cited

U.S. PATENT DOCUMENTS 4,214,430 A * 7/1980 Vogelsberg ............ D07B 3/005
57/293
5,703,983 A * 12/1997 Beasley, Jr. .......... G02B 6/4482
385/103

(Continued)

FOREIGN PATENT DOCUMENTS

WO 2015/123415 A1 8/2015

OTHER PUBLICATIONS

European Patent Application No. 20194105.1 European Search Report dated Feb. 26, 2021; 9 pages; European Patent Office.

*Primary Examiner* — Jerry Rahll
(74) *Attorney, Agent, or Firm* — William D. Doyle

(57) ABSTRACT

Embodiments of the disclosure relate to a method of preparing a bundled cable. In the method, a plurality of subunits is wound around a central member in one or more layers of subunits to form the bundled cable. For a section of the central member, each layer of subunits has a pitch over which a subunit of the layer of subunits makes one revolution around the section of the central member and a length of the subunit required to make the one revolution. The subunits are configured to have a nominal helical length equal to the ratio of a nominal length to a nominal pitch. Further, in the method, a measurement of the bundled cable is monitored, and a winding rate of the plurality of subunits is adjusted based on the measurement in order to account for deviations from the nominal helical length.

3 Claims, 7 Drawing Sheets

Related U.S. Application Data

(60) Provisional application No. 62/895,219, filed on Sep. 3, 2019.

(56) References Cited

U.S. PATENT DOCUMENTS

| | | | | |
|---|---|---|---|---|
| 6,049,648 | A * | 4/2000 | Stokes | G02B 6/4475 |
| | | | | 385/112 |
| 6,243,519 | B1 * | 6/2001 | Ishikawa | G02B 6/4491 |
| | | | | 385/103 |
| 6,775,444 | B1 * | 8/2004 | Hurley | G02B 6/449 |
| | | | | 385/104 |
| 2003/0002830 | A1 | 1/2003 | Petryszak | |
| 2013/0084047 | A1 * | 4/2013 | Baucom | G02B 6/44 |
| | | | | 29/514 |
| 2016/0349471 | A1 | 12/2016 | Logan et al. | |
| 2018/0358794 | A1 * | 12/2018 | Parke | H02G 1/1275 |

* cited by examiner

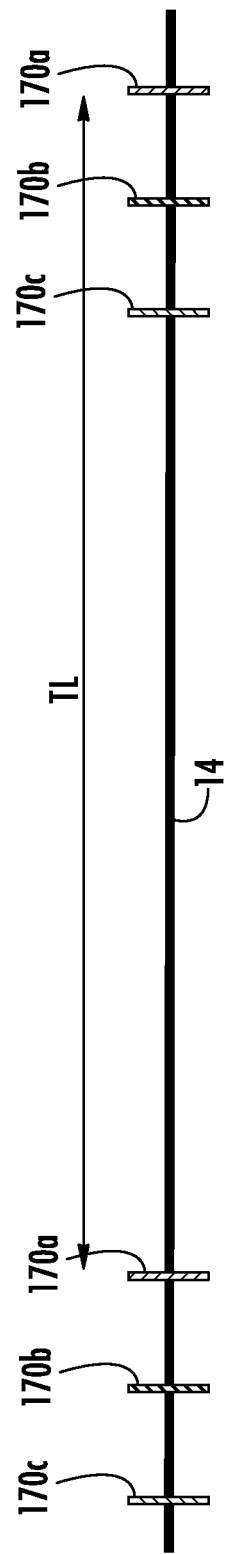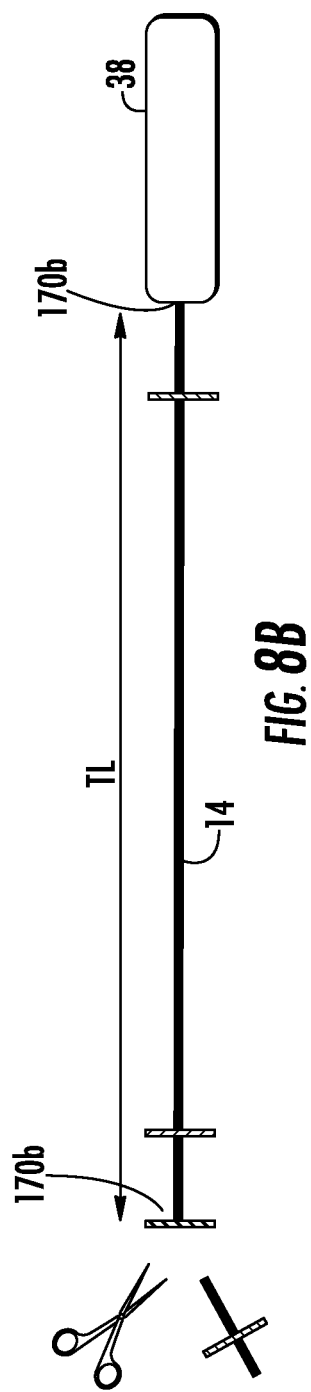

ONLINE HELIX ADJUSTMENT TO CONTROL CONNECTOR LOCATION ON PRECONNECTORIZED TAPERED ASSEMBLIES

CROSS-REFERENCED TO RELATED APPLICATIONS

This application is a divisional application of U.S. patent application Ser. No. 17/002,883 filed Aug. 26, 2020, which claims the benefit of priority under 35 U.S.C. § 119 of U.S. Provisional Application Ser. No. 62/895,219 filed on Sep. 3, 2019, the content of which is relied upon and incorporated herein by reference in its entirety.

BACKGROUND

The disclosure relates generally to optical fiber cables and more particularly to optical fiber cables that have drop cables that run along at least a portion of the length of a main distribution cable. Optical fiber cables are used to transmit data over distance. Generally, large distribution cables that carry a multitude of optical fibers from a hub are sub-divided at network nodes, which are further sub-divided, e.g., to the premises of individual subscribers. Generally, these subdivisions involve splicing a cable tether into a main distribution line. Cable splicing at specific locations along a main distribution line is a delicate and time consuming process that requires precise placement of the cable tether and that involves the risks of cutting the wrong fibers and providing environmental exposure to the cable interior.

SUMMARY

In one aspect, embodiments of the disclosure relate to a method of preparing a bundled cable. In the method, a plurality of subunits is wound around a central member in one or more layers of subunits to form the bundled cable. For a section of the central member, each layer of subunits has a pitch over which a subunit of the layer of subunits makes one revolution around the section of the central member and a length of the subunit required to make the one revolution. The subunits are configured to have a nominal helical length equal to the ratio of a nominal length to a nominal pitch. Further, in the method, a measurement of the bundled cable is monitored, and a winding rate of the plurality of subunits is adjusted based on the measurement in order to account for deviations from the nominal helical length.

In another aspect, embodiments of the disclosure relates to a method of preparing a bundled cable. In the method, a central member is provided having an outer central member surface defining a central member diameter. A plurality of subunits is provided. Each of the plurality of subunits has an outer subunit surface defining a subunit diameter. In the method, the subunit diameter and the central member diameter are monitored. The plurality of subunits is wound around a central member in one or more layers of subunits to form the bundled cable. For a section of the central member, each layer of subunits has a pitch over which a subunit of the layer of subunits makes one revolution around the section of the central member and a length of the subunit required to make the one revolution. The subunits are configured to have a nominal helical length equal to the ratio of a nominal length to a nominal pitch. A winding rate of the plurality of subunits is adjusted based on the monitoring of the subunit diameter and of the central member diameter in order to account for deviations from the nominal helical length.

In still another aspect, embodiments of the disclosure relates to a system for preparing a bundled cable. The system includes a payoff reel configured to provide a run of a central member, a strander configured to wind a plurality of subunits around the central member to form the bundled cable, and a monitoring system configured to take at least one measurement of at least one of the central member, the plurality of subunits, or the bundled cable. The strander is configured to adjust a winding rate for the plurality of subunits based on the measurement from the monitoring system.

In yet another aspect, embodiments of the disclosure relate to a bundled optical fiber cable. The bundled optical fiber cable includes a central member having a first end and a second end. The first end and the second end define a length of the bundled optical fiber cable. The bundled optical fiber cable also includes plurality of subunits wound around the central member. Each of the plurality of subunits includes a subunit jacket having an inner surface and an outer surface. The inner surface defines a central bore containing at least one optical fiber. The plurality of subunits have a variable pitch along the length of the central member, and the outer surface of the subunit jacket of each of the plurality of subunits is an outermost surface of the bundled optical fiber cable.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments.

FIGS. 8A-8B depict an embodiment of subunit indexing to provide a desired helical length, according to an exemplary embodiment.

DETAILED DESCRIPTION

Referring generally to the figures, various embodiments of a method for producing a bundled optical fiber cable are provided. A bundled optical fiber cable includes a plurality of subunits wound around a central member, and each of the plurality of subunits is configured to branch from the cable at a particular branching point along the length of the cable. These cables provide the advantage of being assembled and connectorized in the factory such that the bundled optical fiber cable can be easily deployed without labor-intensive splicing in the field. However, the subunit length must be precise in order that the connectorized end accurately corresponds to drop points in the field. In this regard, the components of the cable have nominal dimensions, but often, the components deviate in dimension by fractions of a millimeter. Over the length of a cable (e.g., a 1 kilometer (km) cable), these small deviations in component size add up to a large deviation in the subunit length and, ultimately, the position of the connectorized end. In certain instances, the deviations in length can be tens of inches.

To account for the deviation in component dimensions, according to the present disclosure, the dimensions of the components prior to winding or the dimensions of the bundled cable after winding are determined. These dimensions are used to adjust the winding rate of the subunits around the central member to ensure that the connectorized ends are accurately terminated at a desired position relative to the branch point. For example, if the connector is running long, the winding rate is increased to decrease the laylength, using more of the subunit, and conversely, if the connector is running short, the winding rate is decreased to increase the laylength, using less of the subunit. Advantageously, the winding rate can be changed without changing the lines speed at which the central member and subunits are being pulled through the winding system. Other aspects and advantages will be described in relation to these and other embodiments provided herein and in the figures. These embodiments are presented by way of illustration and not by way of limitation.

Figure 1:
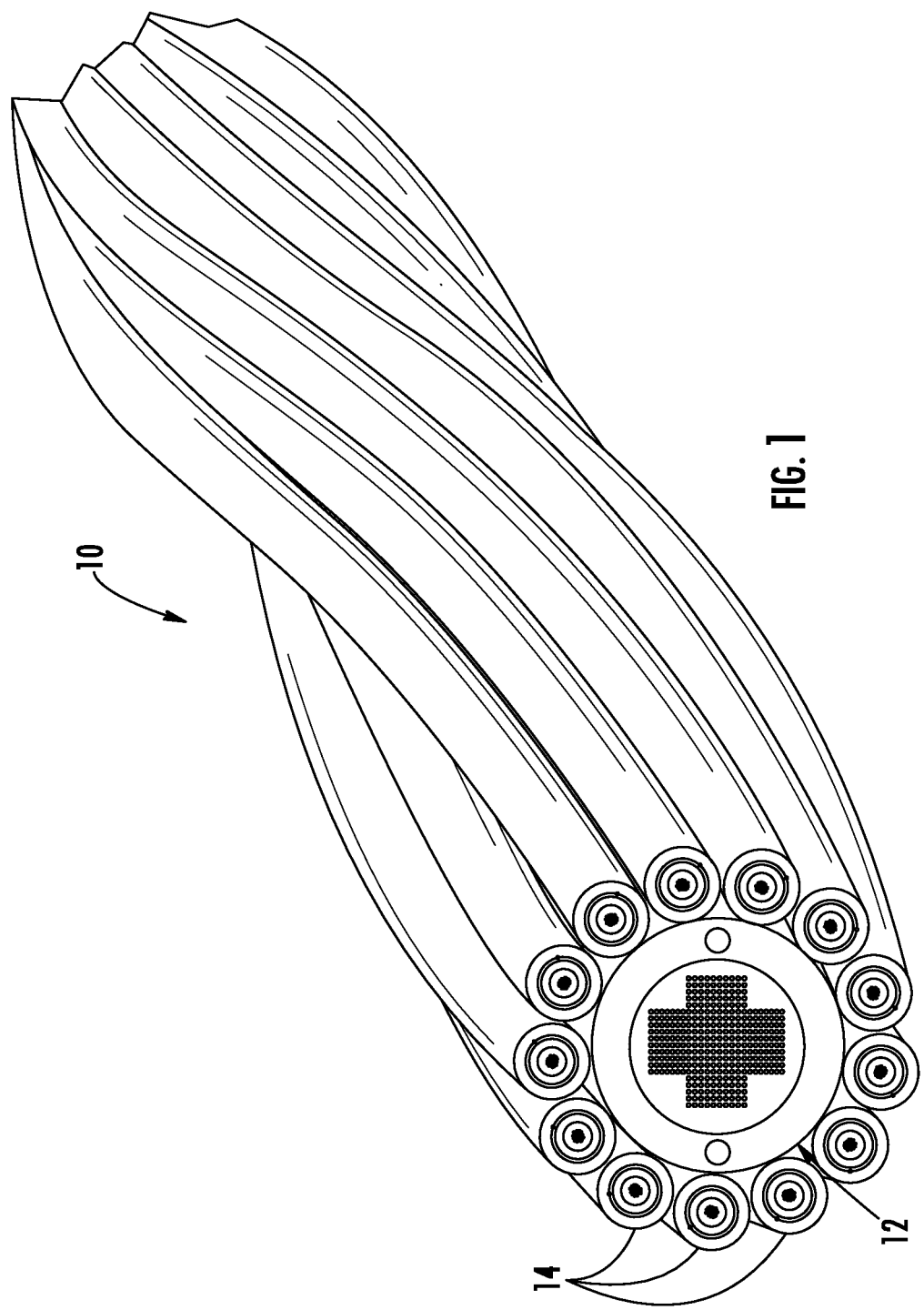
FIG. 1 depicts partial perspective view of a bundled optical cable, according to an exemplary embodiment.

FIG. 1 depicts an embodiment of a bundled optical fiber cable 10 in a partial sectional view taken over a portion of the length of the bundled optical fiber cable 10. As can be seen, the bundled optical fiber cable 10 includes a central member 12 (e.g., an optical fiber cable or an overcoated strength element) and a plurality of subunits 14 that are wound around the outside of the central member 12. In embodiments, the subunits 14 are helically wound around the central member 12. For example, in embodiments, the subunits 14 may have an S-winding or a Z-winding around the central member 12. Additionally, in embodiments, the subunits 14 may have an SZ winding around the central member 12. That is, the subunits 14 may have an S-winding followed by a reversal to a Z-winding, then a reversal to S-winding, etc.

Figure 2:
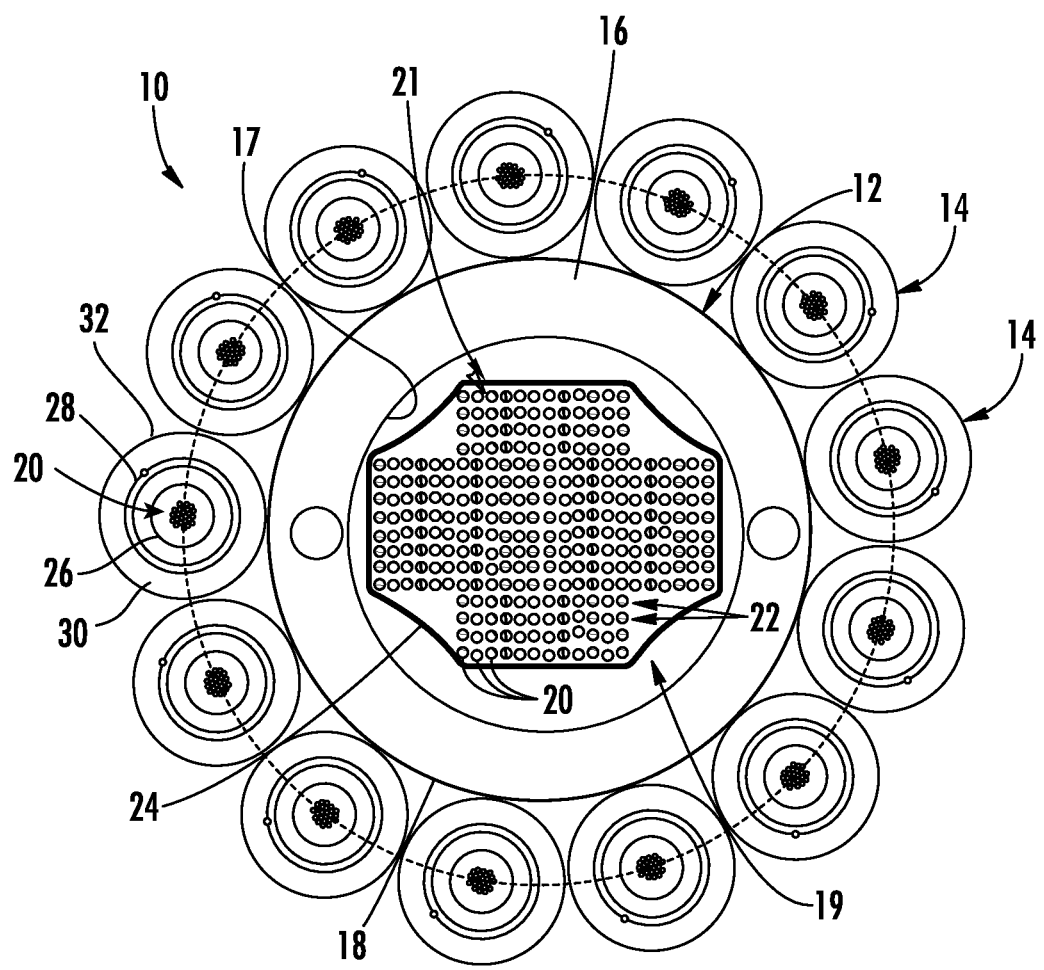
FIG. 2 depicts a cross-sectional view of the bundled optical cable of FIG. 1.

FIG. 2 provides a detailed cross-sectional view of an embodiment of the bundled cable 10. As can be seen, the subunits 14 are substantially evenly spaced around a circumference of the central member 12. In embodiments, the central member 12 may be an optical fiber cable (as shown in FIG. 2), a power transmission cable, or a central strength member (e.g., a glass-reinforced plastic (GRP) rod optionally jacketed with a polymeric material).

In the embodiment depicted, the bundled cable 10 includes thirteen subunits 14. In embodiments, as few as a single subunit 14 can be provided around the central member 12. In general, the maximum number of subunits 14 that can be provided around the central member 12 is limited by the installation parameters (e.g., duct size) or manufacturing capabilities (e.g., winding equipment) for the bundled cable 10. For instance, given an installation parameter of a two inch duct size, the maximum number of subunits 14 that can be provided around the central member 12 may be thirty-nine subunits in embodiments. In still other embodiments, the subunits 14 are arranged in multiple layers around the central member 12. Taking the two inch duct again as an example, the bundled cable 10 may include an innermost layer of the seven subunits 14 around a jacketed GRP rod central member 12 with an intermediate layer of thirteen subunits 14 and an outer layer of another nineteen subunits 14 (7+13+19=39 subunits). In embodiments, the subunits 14 contain optical fibers and/or power transmission elements. Additionally, in embodiments, the subunits 14 may be "dummy cables" that do not contain any optical fibers or power transmission element but which provide structural support around the cable.

FIG. 2 depicts the structure of an embodiment of a bundled cable 10 in which the central member 12 is an optical fiber cable and the subunits 14 are drop cables. In the embodiment depicted, the central member 12 includes an outer jacket 16 having an inner surface 17 and an outer surface 18. In the embodiment depicted, the inner surface 17 defines a cable bore 19 within which a plurality of optical fibers 20 are disposed. The optical fibers 20 can be arranged in a variety of suitable ways within the central member 12. In the embodiment depicted, the optical fibers 20 are arranged in a stack 21 of ribbons 22. In particular, the optical fibers 20 are arranged into a stack 21 of sixteen ribbons 22, defining a plus-shaped cross-section. In the embodiment depicted, the total number of optical fibers 20 in the stack 21 of ribbons 22 is 288. In embodiments, a single stack can contain up to 864 optical fibers 20. As shown in FIG. 2, the stack 21 is surrounded by a stack wrap 24, which, in embodiments, may provide color coding for multiple-stack configurations and/or water-blocking properties. In embodiments, the central member 12 includes multiple stacks 21, e.g., from one stack to twelve stacks. Central members 12 of the type described are available from Corning Incorporated, Corning, N.Y., such as those marketed under the trademark RocketRibbon™. Alternatively, the optical fibers 20 may be arranged in a central tube (or a plurality of buffer tubes) in a loose tube configuration. Central members 12 of this type are available from Corning Incorporated, Corning, N.Y., such as those marketed under the trademarks ALTOS®, SST-Ribbon™, and SST-UltraRibbon™.

As can also be seen in the embodiment depicted in FIG. 2, the subunits 14 each include a plurality of optical fibers 20 disposed within a central tube 26. In embodiments, the subunits 14 contain from one optical fiber 20 up to thirty-six optical fibers 20 depending on the particular needs of the installation. In embodiments, the central tube 26 is surrounded by a plurality of tensile elements 28 (e.g., yarns of aramid, glass, and/or basalt fibers). The tensile elements 28 are surrounded by a subunit jacket 30. In embodiments, the subunit jacket 30 has an outer surface 32, and for the subunits 14 immediately surrounding the central member 12, the outer surface 32 of the subunits 14 contacts the outer surface 18 of the outer jacket 16 of the central member 12. In embodiments, the subunits 14 may be bonded (e.g., welded or adhered) to the central member 12 at one or more locations along the length of the central member 12. Further, in embodiments, the outer surface 32 of the subunit jacket 30 may define an outermost surface of the bundled cable 10. That is, no further jacketing material is applied around the subunits (not including any periodically spaced bindings, wraps, or ties which may be used to keep the subunits 14 bound to the central member 12).

Figures 3A, 3B:
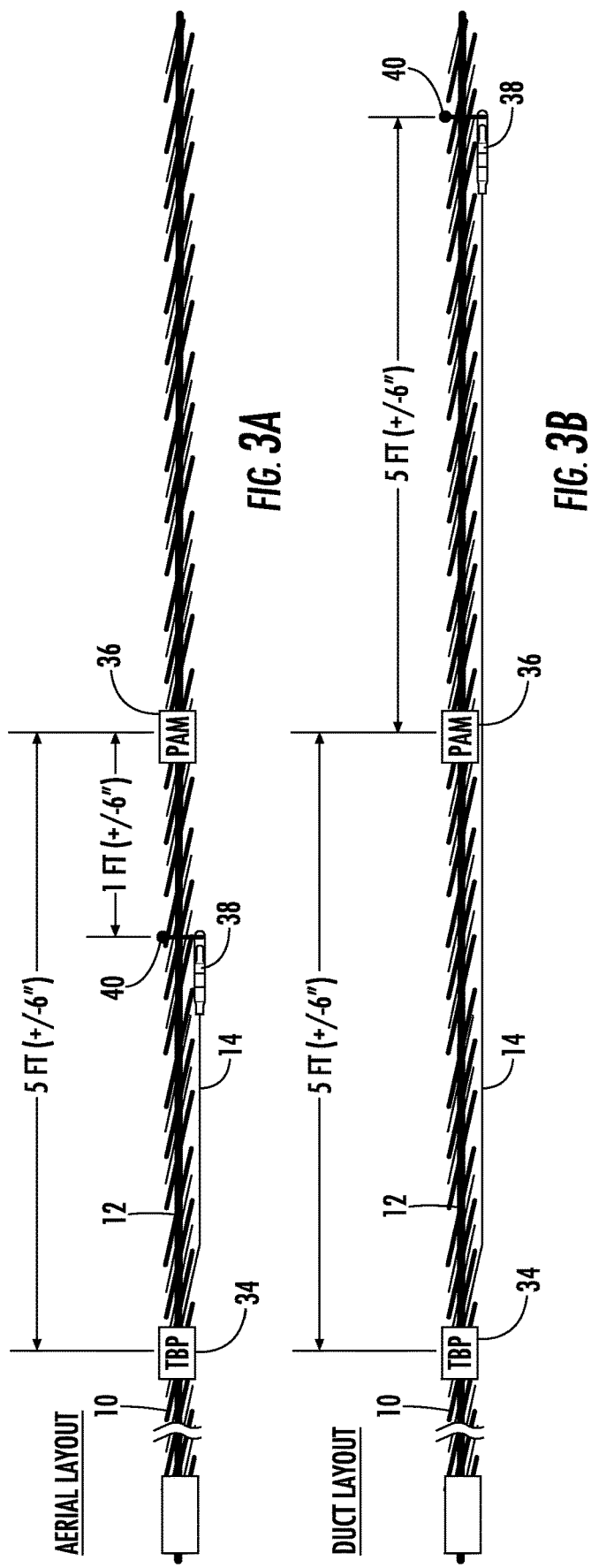
FIGS. 3A-3B are schematic depictions of an aerial installation and a duct installation of a bundled optical fiber, according to an exemplary embodiment.

FIGS. 3A and 3B depict a schematic representation of a bundled cable 10 with a subunit 14 branching from the central member 12 at a branch point 34. To provide enough slack to make a connection at the branch point (TBP) 34 and to properly position the subunit 14, the subunit 14 is terminated at a particular location along the length of the bundled cable 10. As shown in FIGS. 3A and 3B, the bundled cable 10 may be marked with a pole alignment marker (PAM) 36. During installation, the bundled cable 10 is positioned such that the pole alignment marker 36 is substantially centered on an installation pole or other alignment structure. As can be seen, the subunits 14 in the bundled cables 10 shown in FIGS. 3A and 3B are preconnectorized with a connector 38. In the embodiment shown, the connectors 38 are attached to the bundled cable 10 with a tie wrap 40.

Depending on the type of installation, the subunit 14 may be terminated at different lengths. FIG. 3A depicts the layout for an aerial installation, and FIG. 3B depicts the layout for a duct installation. As can be seen, for both layouts, the branch point 34 may be positioned within about 5 ft (+/−6 in) from the pole alignment marker 36. In the aerial layout of FIG. 3A, the subunit 14 nominally terminates about 1 ft (+/−6 in) prior to the pole alignment marker 36. In the duct layout of FIG. 3B, the subunit 14 terminates nominally about 5 ft (+/−6 in) past the pole alignment marker 36. As will be discussed below, a variety of factors dictate whether the subunits 14 are able to be accurately positioned at the nominal termination points along the length of the bundled cable 10 such that during installation the subunits 14 will be located at the desired position relative to the pole alignment marker 36.

Figure 4:
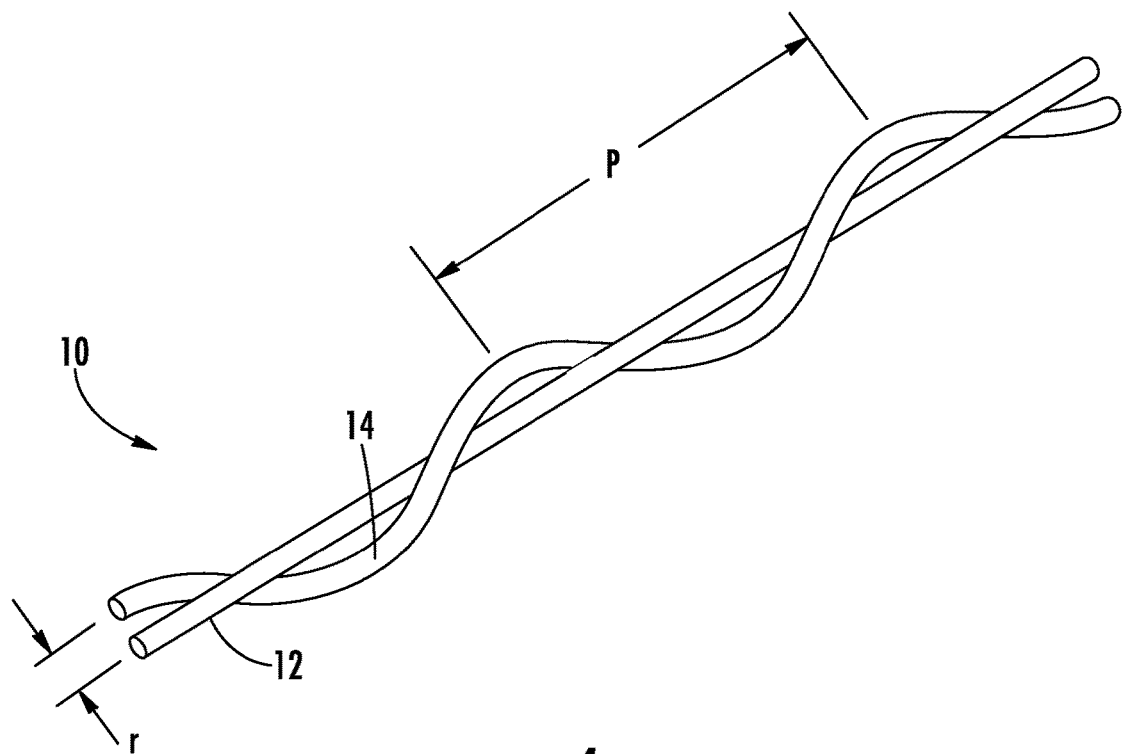
FIG. 4 provides a schematic representation of the geometric relationship between a subunit and a central member during winding, according to an exemplary embodiment.
Figure 5:
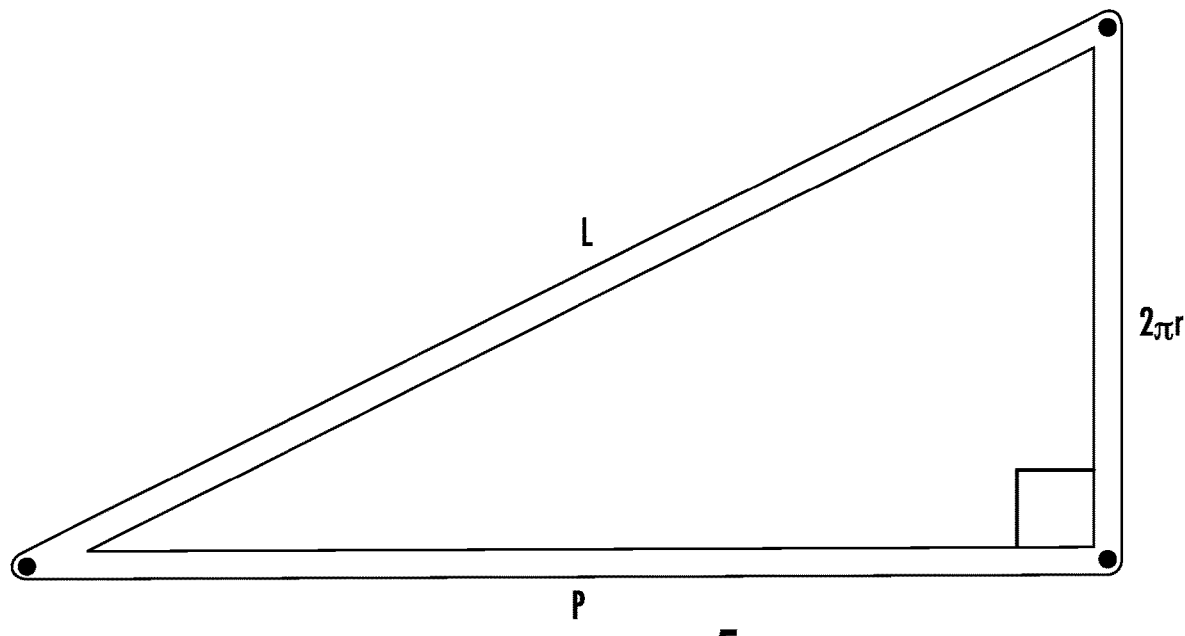
FIG. 5 depicts another geometric relation pertaining to the helical length of the stranded unit, according to an exemplary embodiment.

Because the subunits 14 are wound around a central member 12, the actual, fully-extended length of the subunits 14 is longer than the length along the central member 12. FIG. 4 illustrates this point with a depiction of a single subunit 14 wound around a central member 12. To accurately position the connector 38 along the bundled cable 10, the total length of each subunit 14 prior to winding needs to be known. Otherwise, the winding machine has to be stopped when the desired termination point is reached so that the subunit 14 can be connectorized on-line. As shown in FIG. 4, the winding of the subunit 14 around the central member 12 defines a pitch circle having radius r. Further, the length over which the subunit 14 completes one revolution around the central member 12 is referred to as the pitch P (which is also known as "laylength"). The extended length of subunit 14 necessary to complete one revolution is referred to as the length L, and the length L can be determined through a relationship between the radius r of the pitch circle and the pitch P as shown in FIG. 5. In particular, the length L is the hypotenuse of a right triangle having a first side length of P and a second side length of $2\pi r$. Accordingly, from FIGS. 4 and 5, it can be seen that at least two factors that directly affect length L are pitch P and radius r. Other factors that affect length L will be discussed below but include forces that elongate the subunit 14 or central member 12 or introduce additional twist (affecting pitch P)).

Specifically, from the geometric relationship shown in FIG. 5, a ratio between the length L and pitch P, referred to as the helical length HL (L/P=HL), can be determined from the pitch P and radius r based on the following equation:

$$HL = \sqrt{1 + \left(\frac{2\pi r}{P}\right)^2}$$

Figure 6:
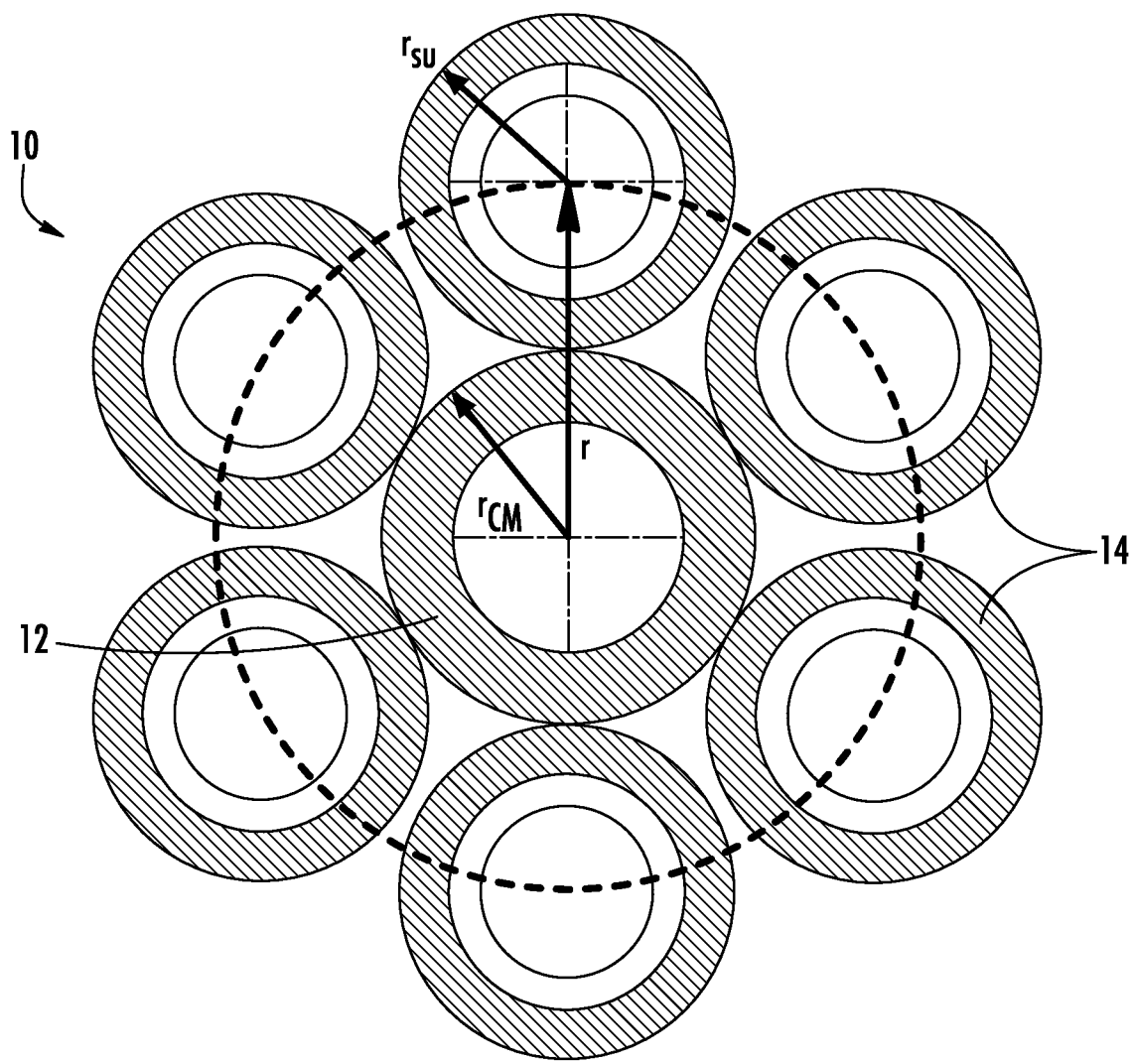
FIG. 6 depicts a cross-section of a bundled cable demonstrating the r dimension, according to an exemplary embodiment.

In general, pitch P is nominal based on the cable design, and thus, the main variable affecting helical length HL is the radius r of the pitch circle. That is, during cable stranding, the machinery will be set up to produce a specified pitch P, but as will be discussed below, small deviations in radius r ultimately affect the actual pitch P of the subunit as stranded around the central member 12. As can be seen in FIG. 6, the radius r of the pitch circle is essentially equal to the sum of the radius $r_{su}$ of the subunit 14 and the radius $r_{cm}$ of the central member 12. While each of the subunit 14 and the central member 12 has a nominal diameter, the diameter is variable over the length of each subunit 14 and central member 12 in practice, e.g., resulting from variability in the extrusion process.

To demonstrate the effect that even a small variation in the diameter of the central member 12 has on the helical length HL of the subunit 14, a simulation was performed with a bundled cable 10 having six subunits 14 stranded around a jacketed GRP central member 12. In the simulation, each subunit 14 has a nominal outer diameter of 4.0 mm, and the central member 12 has a nominal outer diameter of 4.4 mm. A variability of +/−0.1 mm in the diameter of the central member 12 was considered. The simulation was a Monte Carlo simulation involving 5000 iterations of winding subunits having a 4.0 mm diameter helically around central members 12 having a normal distribution of diameters between 4.3 mm and 4.5 mm (i.e., nominal 4.4 mm with +/−0.1 mm deviation). According to the simulations, a connector movement of +/−2 inches developed over 100 meters (m). Thus, over the length of a 300 m cable, the deviation would already be at the level of tolerance discussed above with respect to aerial and duct installations described in relation to FIGS. 3A and 3B. As the length of the bundled cable grows, the connector movement increases. For example, a cable that is 1 km long would have a connector displacement of as much as 20 inches.

Moreover, this simulation only considered one source of deviation (the diameter of the central member 12). The diameters of the subunits 14 could also vary along their length. Besides the dimensions of the components of the bundled cable 10, other factors affect the actual pitch and helical length of the subunits 14. The tension at which the central member 12 and subunits 14 are pulled through the processing line affects their lengths during the stranding operation. For example, a higher tension will create more elongation in the central member 12 and/or subunits 14 than a lower tension during stranding. After stranding, there may be a relaxation that causes the central member or subunits 14 to shrink back, affecting pitch. Further, the stranding and pulling of the cable creates torsional error that affects pitch. When multiple factors are considered, the deviation in connector placement increases to about 3.5 inches per 100 m. Additionally, in embodiments in which multiple layers of subunits are provided, the deviation in connector placement can increase further still. As shown in FIG. 6, the subunits 14 have a small gap between them around the circumference of the central member 12. In outer layers, this gap can become compressed, leading to an additional source of deviation. In addition, deviation in connector placement in a second layer can be as much as about 5.7 inches per 100 m and in a third layer can be as much as about 6.2 inches per 100 m.

Figure 7:
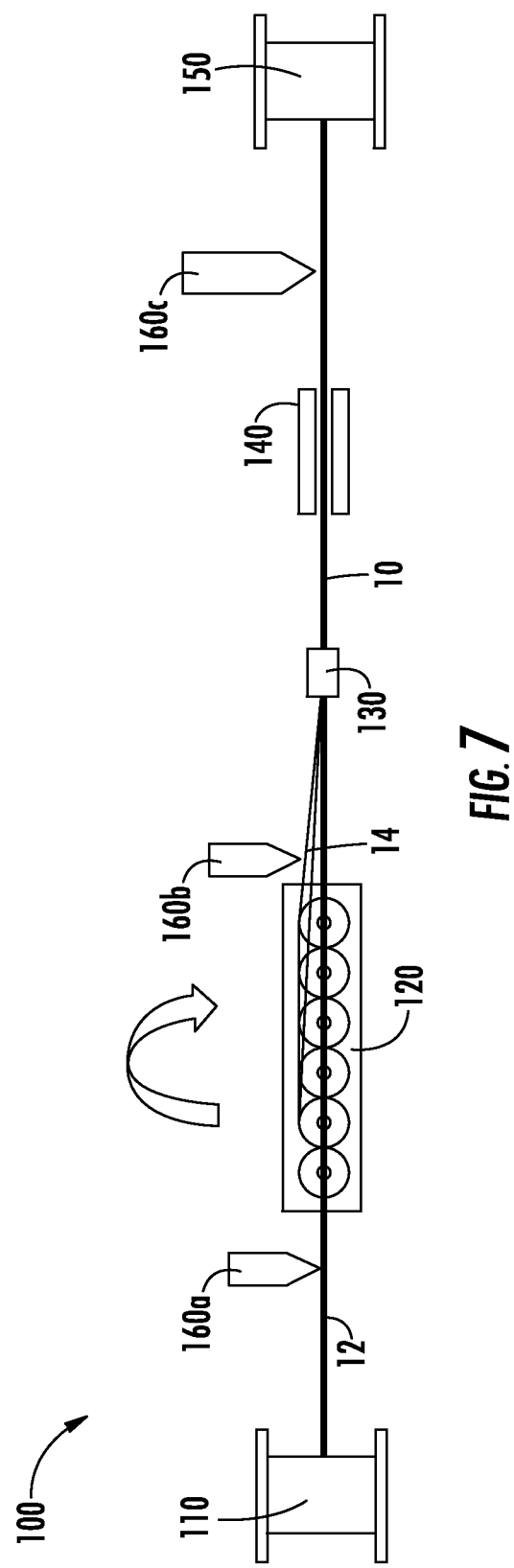
FIG. 7 is a schematic depiction of a system for performing a winding rate adjustment, according to an exemplary embodiment.

To accommodate the potentially large deviations in the position of the subunits as the result of small deviations in the dimensions of the subunits, monitoring the dimensions of the subunits and/or central member as the subunits are wrapped around the central member and adjusting the rate at which the subunits are wound around the central member is employed. FIG. 7 depicts a system 100 for adjusting the winding rate. In the system 100, the central member 12 is carried on a payoff reel 110. The central member 12 runs through a strander 120, such as a rigid or planetary strander, which winds or wraps the subunits 14 around the central member 12. The central member 12 and subunits 14 pass through a closing point 130 to create the bundled cable 10. The bundled cable 10 is pulled by a caterpuller 140, and the bundled cable 10 is taken up on a take-up reel 150. In other embodiments, the strander 120 could be a drum twist strander that rotates the payoff and takeup reels 110, 120 in lieu of rotating the outer subunits 14 around the central member 12.

To adjust the winding rate, the diameter of the central member 12, the diameter of the subunits 14, the diameter of the bundled cable 10, and/or the pitch P of the subunits 14 are monitored. For example, as shown in FIG. 7, the system 100 includes monitoring stations 160a, 160b, and 160c. Monitoring station 160a is positioned upstream of the strander 120 to capture the diameter of the central member 12. Monitoring station 160b is positioned proximate to the strander 120 (e.g., near the subunit feed for the strander 120) in order to capture the dimensions of the subunits 14. Further, monitoring station 160c is positioned after the closing point 130 to capture the dimensions of the bundled cable 10 or to capture the pitch P of the subunits 14. In embodiments, only monitoring station 160c is used, and the dimensions of the bundled cable 10 are used to adjust the winding rate for the upstream cable. In other embodiments, only monitoring stations 160a and 160b are used to measure the dimensions of the individual components to adjust the winding ratio downstream of the monitoring stations 160a, 160b.

In embodiments, the monitoring stations 160a, 160b, 160c directly measure the dimensions of the central member 12, subunits 14, and/or bundled cable 10 using a probe, such as a non-contact laser. In embodiments used in conjunction with the measuring probes, a vision system may be located at monitoring station 160c that measures the pitch (or laylength) by capturing images of the bundled cable 10. The vision system compensates for errors in the laylength based on torsional effects leading into the caterpuller 140. Another way to measure the correct location for landing the connector is by measuring length of the individual subunits as well as the length of the central member and adjusting the laylength based on maintaining a desired ratio between the lengths.

By monitoring the dimensions of the bundled cable 10 or cable component, the winding rate of the strander 120 can be adjusted to increase or decrease the pitch P so that the connector is accurately positioned in relation to pole access markers along the length of the bundled cable 10. Advantageously, the feed rates of the central member 12 and subunits 14 do not have to be adjusted, which allows for the desired production rate to be maintained despite deviations in component size. Thus, using a system 100 as depicted in FIG. 7, the minor deviation in component dimensions can be accommodated through adjusting of the winding rate as shown in Table 1, below.

In Table 1, a bundled cable having a subunit diameter of 4.0 mm was used with a central member having a nominal diameter of 4.4 millimeters (mm). The laylength (pitch P) for such a cable was 125 mm. As can be seen in a comparison of Example 1 (no deviation) and Examples 2 and 3 (negative deviation and positive deviation, respectively), each bundled cable had no deviation in length (L). However, the winding rate was increased by 1.9 rpm for Example 2 and decreased by 1.9 rpm for Example 3. The winding rates caused Example 2 to have a shorter pitch than Example 1 and caused Example 3 to have a longer pitch than Example 1.

TABLE 1

Properties of Subunits and Central Member used in Bundled Cable Simulations

|  | Ex. 1 | Ex. 2 | Ex. 3 |
| --- | --- | --- | --- |
| Unit Diameter (mm) | 4.0 | 4.0 | 4.0 |
| Layer 1 Units | 6 | 6 | 6 |
| Central Member Diameter (mm) | 4.4 | 4.3 | 4.5 |
| Layer 1 Pitch (mm) | 125.00 | 123.51 | 126.49 |
| Layer 1 Helical Length (HL or L/P) | 1.022 | 1.022 | 1.022 |
| Helix length variation (in/100 m) | 0.000 | 0.000 | 0.000 |
| Rotational speed (rpm) | 160.0 | 161.9 | 158.1 |

Besides winding rate, the final properties of the bundled cable can be influenced by providing accurately cut subunits for winding around the central member 12. FIGS. 8A and 8B depict an embodiment of an indexed subunit 14. As can be seen in FIG. 8A, the subunit 14 includes a number of coordinated index marks 170a, 170b, 170c. Each set of index marks 170a, 170b, 170c is separated by the desired total length TL of the subunit 14. In preparing the subunit 14 for winding, the subunit 14 is connectorized at an end. As shown in FIG. 8A, the subunit 14 has a preselected connectorization index point and a corresponding index point for trimming the subunit to length. Accordingly, if a successful connectorization is made at index mark 170a, the subunit 14 is trimmed at the corresponding index mark 170a at the opposite end of the subunit to provide the desired total length TL of the subunit 14 as shown in FIG. 8B. If the connectorization at index mark 170a is not successful, then connectorizaion is attempted at index mark 170b, and so on, and the corresponding index mark is used to trim the subunit 14 to the desired length thereafter.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A bundled optical fiber cable, comprising:
   a central member having a first end and a second end, the first end and the second end defining a length of the bundled optical fiber cable;
   a plurality of subunits wound around the central member, each of the plurality of subunits comprising a subunit jacket having an inner surface and an outer surface, wherein the inner surface defines a central bore containing at least one optical fiber;
   wherein the plurality of subunits have a variable pitch along the length of the central member; and
   wherein the outer surface of the subunit jacket of each of the plurality of subunits is an outermost surface of the bundled optical fiber cable;
   wherein the bundled optical fiber cable is an aerial cable and wherein the bundled optical fiber cable comprises a plurality of pole alignment markers along the length of the bundled optical fiber cable;
   wherein each of the plurality of subunits branches from the central member at a branch point located within five feet of a pole alignment marker of the plurality of pole alignment markers; and
   wherein each of the plurality of subunits is configured to terminate within 6 inches of a nominal termination point located towards the first end of the bundled optical fiber cable and one foot from a pole alignment marker of the plurality of pole alignment markers.

2. The bundled optical fiber cable of claim 1, wherein the central member comprises at least one of an optical fiber cable comprising an outer jacket surrounding a plurality of optical fibers or a central strength member comprising a strength element and an outer jacket formed around the strength element.

3. A bundled optical fiber cable, comprising:
   a central member having a first end and a second end, the first end and the second end defining a length of the bundled optical fiber cable;
   a plurality of subunits wound around the central member, each of the plurality of subunits comprising a subunit jacket having an inner surface and an outer surface, wherein the inner surface defines a central bore containing at least one optical fiber;
   wherein the plurality of subunits have a variable pitch along the length of the central member; and
   wherein the outer surface of the subunit jacket of each of the plurality of subunits is an outermost surface of the bundled optical fiber cable;
   wherein the bundled optical fiber cable is a duct cable and wherein the bundled optical fiber cable comprises a plurality of pole alignment markers along the length of the bundled optical fiber cable;
   wherein each of the plurality of subunits branches from the central member at a branch point located within five feet of a pole alignment marker of the plurality of pole alignment markers; and
   wherein each of the plurality of subunits is configured to terminate within 6 inches of a nominal termination point located towards the second end of the bundled optical fiber cable and five feet from a pole alignment marker of the plurality of pole alignment markers.

* * * * *